March 10, 1931.  J. C. LEHMANN  1,795,871
REAR VIEW MIRROR BRACKET
Filed Sept. 22, 1930  2 Sheets-Sheet 1

INVENTOR
Julius C. Lehmann
BY
ATTORNEY

March 10, 1931.  J. C. LEHMANN  1,795,871
REAR VIEW MIRROR BRACKET
Filed Sept. 22, 1930  2 Sheets-Sheet 2
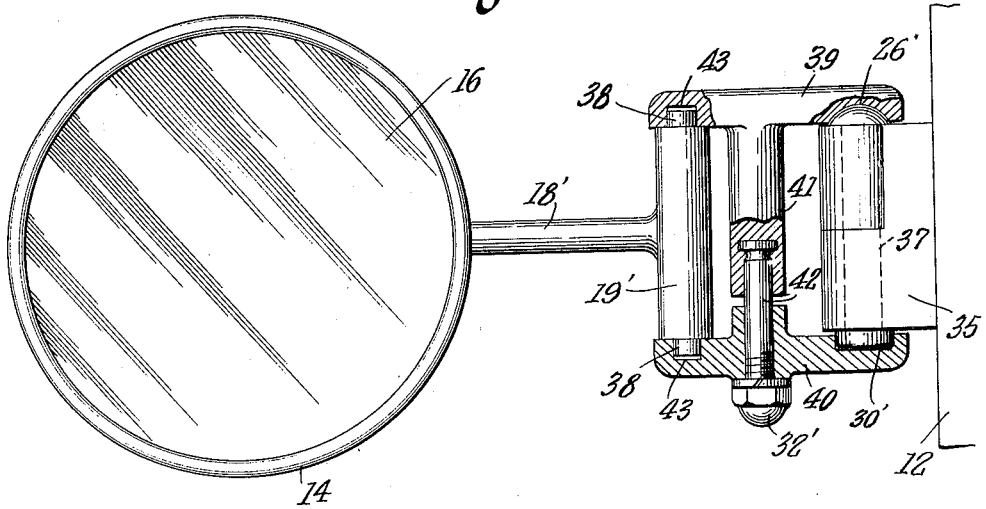
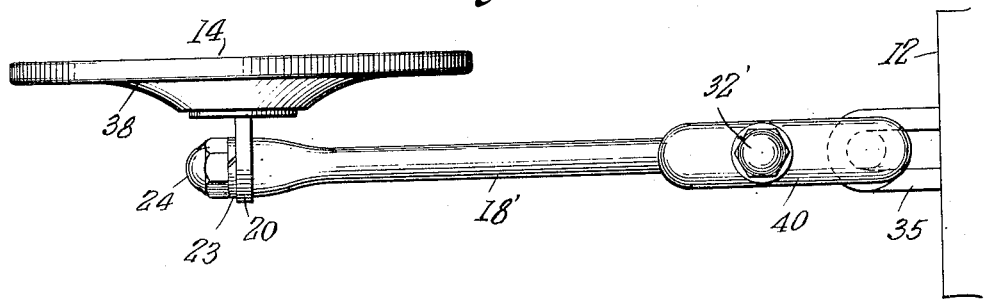
INVENTOR
Julius C. Lehmann
BY
ATTORNEY Patented Mar. 10, 1931

1,795,871

UNITED STATES PATENT OFFICE

JULIUS C. LEHMANN, OF NEW YORK, N. Y., ASSIGNOR TO PHILIP RAUCH, OF BROOKLYN, NEW YORK

REAR-VIEW-MIRROR BRACKET

Application filed September 22, 1930. Serial No. 483,565.

This invention relates to improvements in rear-view mirrors and their attachment on automobiles or similar vehicles, and more particularly relates to the means for attaching such rear-view mirror to a door hinge on the door forward of the driver.

It is the object of my invention to povide a satisfactory outside rear-view mirror which can be easily and quickly applied to the automobile without any change in the automobile structure and without the necessity for the use of complicated tools or the like.

Another object of this invention is to provide a bracket for rear-view mirrors which may be attached to the hinge pin in the upper front door hinge of an automobile so that the mirror is always in position to reflect rear-view traffic conditions.

It is another object of this invention to provide a securing means for attaching a rear view mirror adjacent the upper front corner of a motor vehicle body, without deforming or altering the body to permit observation of rear traffic conditions.
It is still a further feature of this invention to provide means for supporting an object on a hinge of a vehicle door.

Further objects and advantages of this invention will appear from the following description, together with the attached drawings illustrating the preferred forms of embodiment thereof, and in which:—

Figure 3 shows a view similar to Figure 1, showing a modified form of bracket.

Figure 1:
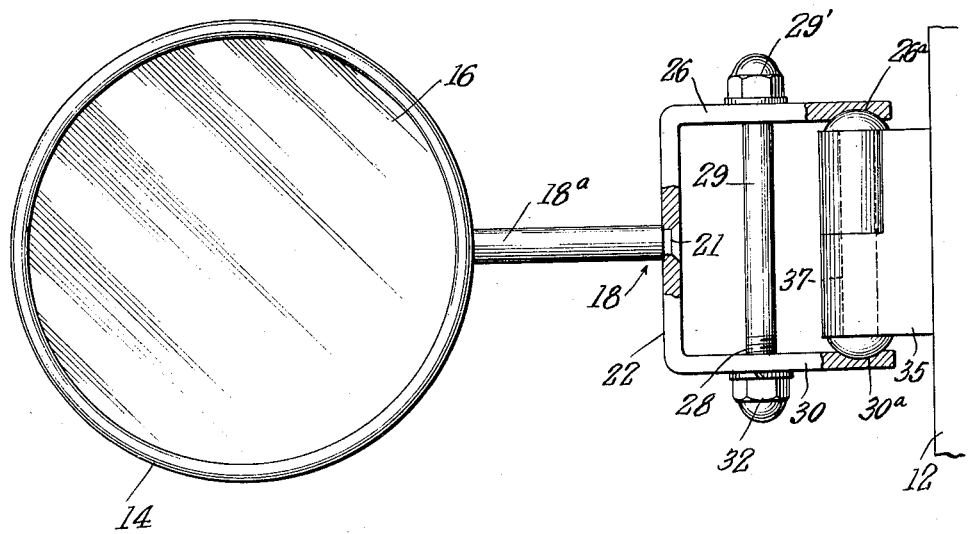
Figure 1 is an elevation of the mirror and attaching bracket showing a hinge and also a hinge pin in dotted outline.
Figure 2:
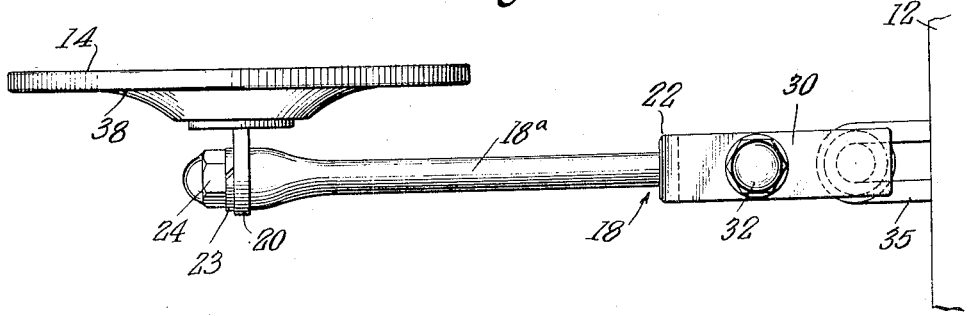
Figure 2 is a bottom view of the same.

Figure 4 is a bottom view of the same.
A motor vehicle (not shown) is provided with the customary front door 12 through which the operator may observe rear traffic conditions as reflected in the mirror 14. This mirror is provided with a reflecting surface 16 which may have either a concave surface, or the usual plane surface, the only difference being that the plane mirror reflects directly, where the concave mirror concentrates the image of the traffic conditions thereon. The backing plate 38 is also provided to reinforce the support for the mirror and it may preferably be suitably plated to improve the appearance of the mirror.

The mirror 16 is supported by a bracket 18 which is comprised of a central horizontal extending axis 18a on which the mirror lug 20 is secured.

The lug 20 is provided with an opening to pivotally receive the shank of a bolt 24, the latter threadedly engaging the central horizontal extending axis 18a.

Between the lug 20 and the head of the nut 24, is interposed a split washer 23 which co-operates with the head of the nut 24 to retain the mirror in adjusted position with relation to the extending axis 18a. The other end of the axis 18a is threaded to engage a screw 21 which extends through an orifice of a substantially U-shaped member 22, the upper arm 26 of which has a downwardly opened recess 26a therein, and the lower arm 30 of which is also suitably recessed at 30a, which opens upwardly for a purpose to be hereinafter shown.

A nut 32 screw threaded on the end 28 of a bolt 29 having a permanent head 29', is adapted to force the arms 26 and 30 of the U-shaped member 22 towards each other. The front door 12 of the vehicle is hinged by the hinge 35 having the pin 37 non-rotatably secured in the butt attached to the door jamb. The upper end of this pin 37 has the usual crown over which the recess 26a in the U-shaped member securely fits.

The lower extension of the pin 37 projects below the butt of the hinge 35 and extends into the recess 30a in the lower arm 30 of the U-shaped member or yoke 22.

It will thus be seen that by adjustment of the nut 32, the arms 26 and 30 are forced toward each other so that the ends thereof are forced in contact with the hinge pin. As the hinge pin does not rotate no matter whether the door is moved or not, it is a fixed support for the mirror and the mirror may be permanently secured in place thereto.

The nut 32 provides for angular movement in one plane, and the nut 24 provides for angular movement in the other plane.

The operator may adjust the mirror in this manner in order to clearly observe conditions to the rear of the vehicle, and the mirror is outside of the vehicle and not subject to steaming glass or drawn curtains or internal reflections or any other objections.

A modified form of mirror bracket is shown in Figures 3 and 4. The extended projection of the bracket which is attached to the lug 20 of the mirror in a manner hereinbefore mentioned is T-shaped in form and comprises the central horizontal extending axis 18' and the cross portion 19', the latter having studs 38 projecting from each of the ends thereof. The bracket is provided with upper and lower elements 39 and 40, respectively, the upper element 39 of which has a downwardly projecting portion 41 to which is secured therein in any suitable manner a stud 42 which is adapted to project through an opening in the lower portion 40 to engage a nut 32' by which the lower portion is pivotally supported on the stud 42 of the upper element 39. The outer ends of the elements 39 and 40 are provided with recesses 43, within which extend the studs 38.

The inner ends of the said elements 39 and 40 are provided with recesses 26' and 30', respectively, similar to the recesses 26a and 30a shown in Figure 1 and for a purpose identical as that described hereinbefore.

It will thus be seen that by adjustment of the nut 32', the lower element 40 of the bracket may be forced upward to co-operate with the upper element 39 of the bracket to force the outer ends of each thereof in contact with portion 19' of the T-shaped extended projection and the inner ends of each thereof in contact with the hinge pin. In this form of bracket, not only the angular movements hereinbefore described, but also the lateral radial movements of the T-shaped member with relation to the parallel clamp, may be accomplished.

It is possible that in some vehicles the hinge pin may be secured to the movable half of the hinge so that when the door opens, the mirror will open with it. Under such circumstances, it will be necesary to secure the pin permanently to the movable half of the hinge in order that when the door closes the mirror will again be in the proper focused position.

The important point however, is that no matter which type is used, the mirror does not extend sufficiently far beyond the side of the vehicle, to be struck and does not in anyway interfere with the opening of the door. It is unobstrusive, out of the way, and yet highly convenient, easily adjusted and always available.

This mirror is adapted to be attached to a door hinge without the requirement of tools and does not necessitate extensive changes, or, in fact, any changes being made in the vehicle body. The usual hinge and hinge pin is used and removal or changing of the hinge pin is unnecessary.

It is an accessory which is compact in form and which will successfully satisfy the condition for which constructed, namely, that of reflecting rear-view positions accurately and permanently without being subject to vibration or any other disturbance of adjustment, or any interference due to adverse driving conditions.

It is understood that any reflector or any other object may be substituted for the rear-view mirror, the essential feature of the invention being in the provision of a bracket for a door hinge of an automobile body.

While I have shown and described the preferred form of embodiment of this invention, I am well aware that other modifications may be made and I, therefore, desire a broad interpretation of the invention within the scope and spirit of the disclosure herein and the claims appended hereto.

I claim:

1. A bracket for a door hinge of the class described, comprising an element having downwardly opening recesses therein, a second element removably and telescopically secured to said former element to form a clamp, and having upwardly opening recesses therein in alinement with the recesses in said former element, and a member, said clamp receiving the ends of the usual hinge pin and the ends of said member in the corresponding alined recesses.

2. A reflector bracket for a door hinge of the class described comprising an element having downwardly opening recesses therein, and provided with a downwardly extending portion disposed between said recesses, a second element removably and telescopically secured to the downwardly extending portion of said former element to form a clamp and having upwardly opening recesses each in alinement with a corresponding recess in said former element, and a member securing a reflector to the bracket, said clamp receiving the ends of the usual hinge pin and said member in the respective alined recesses.

3. In combination with a door-hinge having a pintle with protruding ends, a T-shaped member, a bracket, said bracket comprising a yoke having recesses adapted to embrace the ends of the pintle and recesses adapted to embrace the opposed ends of said member, and means to clamp the yoke over the ends of the hinge pin and said member.

Signed at New York, in the county and State of New York, this 22nd day of August, 1930.

JULIUS C. LEHMANN.